(12) United States Patent
Chen

(10) Patent No.: US 10,315,720 B2
(45) Date of Patent: Jun. 11, 2019

(54) WATER SHIELD FOR USE IN A FRICTION DRIVE VEHICLE AND A VEHICLE HAVING SAME

(71) Applicant: Shane Chen, Camas, WA (US)

(72) Inventor: Shane Chen, Camas, WA (US)

(*) Notice: Subject to any disclaimer, the term of this patent is extended or adjusted under 35 U.S.C. 154(b) by 0 days.

(21) Appl. No.: 15/293,181

(22) Filed: Oct. 13, 2016

(65) Prior Publication Data

US 2017/0284531 A1    Oct. 5, 2017

Related U.S. Application Data

(63) Continuation of application No. 62/241,050, filed on Oct. 13, 2015.

(51) Int. Cl.
| | | |
|---|---|---|
| *B62K 1/00* | (2006.01) | |
| *B62K 11/00* | (2006.01) | |
| *B62M 13/00* | (2010.01) | |
| *B62J 23/00* | (2006.01) | |

(52) U.S. Cl.
CPC ............. *B62K 1/00* (2013.01); *B62J 23/00* (2013.01); *B62K 11/007* (2016.11); *B62M 13/00* (2013.01)

(58) Field of Classification Search
CPC ........ B62K 11/007; B62K 1/00; B62M 13/00; B62D 25/16; B62D 25/18; B62D 25/186
See application file for complete search history.

(56) References Cited

U.S. PATENT DOCUMENTS

| | | | | |
|---|---|---|---|---|
| 1,905,674 A | * | 4/1933 | Babbs | B60B 7/00 152/154 |
| 4,109,741 A | * | 8/1978 | Gabriel | B62K 1/00 180/21 |
| 4,324,413 A | * | 4/1982 | Bensette | B62K 1/00 180/21 |
| 7,543,834 B2 | * | 6/2009 | Goczey | B62K 1/00 280/205 |
| D624,136 S | * | 9/2010 | Chen | D21/760 |
| 8,403,083 B2 | * | 3/2013 | Waita | B62K 11/007 180/21 |
| 8,443,920 B2 | * | 5/2013 | Gomi | B62J 1/005 180/21 |
| 8,522,902 B2 | * | 9/2013 | Gomi | B62J 1/005 180/208 |
| 8,616,313 B2 | * | 12/2013 | Simeray | B62K 1/00 180/181 |
| 8,807,250 B2 | * | 8/2014 | Chen | B62K 1/00 180/21 |
| 9,085,334 B2 | * | 7/2015 | Hoffmann | B62K 1/00 |
| D747,668 S | * | 1/2016 | Chen | D12/107 |
| 9,481,423 B2 | * | 11/2016 | Chen | B62K 1/00 |
| 9,731,783 B2 | * | 8/2017 | Artemev | B60L 11/1864 |
| 9,796,444 B1 | * | 10/2017 | Lin | B62K 15/006 |

(Continued)

*Primary Examiner* — Joseph M Rocca
*Assistant Examiner* — Michael R Stabley
(74) *Attorney, Agent, or Firm* — Steven J. Sullivan

(57) ABSTRACT

A water shield structure for a transportation device and the transportation device having such a water shield structure. The transportation device is preferably a self-balancing device and may include a friction drive motor. The water shield structure helps reduce the entry of moisture from a riding surface into the wheel envelope or drive mechanism of the device. The water shield structure may extend laterally from a wheel and be enclosed, at least in part, in a housing.

20 Claims, 5 Drawing Sheets

(56) References Cited

U.S. PATENT DOCUMENTS

| | | | |
|---|---|---|---|
| 2008/0143073 A1* | 6/2008 | Ungar | B62K 1/00 280/205 |
| 2013/0133959 A1* | 5/2013 | Kamiyama | B62D 15/00 180/6.2 |
| 2013/0228385 A1* | 9/2013 | Chen | B62K 3/007 180/6.5 |
| 2014/0058600 A1* | 2/2014 | Hoffmann | B62K 1/00 701/22 |
| 2016/0339328 A1* | 11/2016 | Simeray | A63C 17/0093 |

* cited by examiner

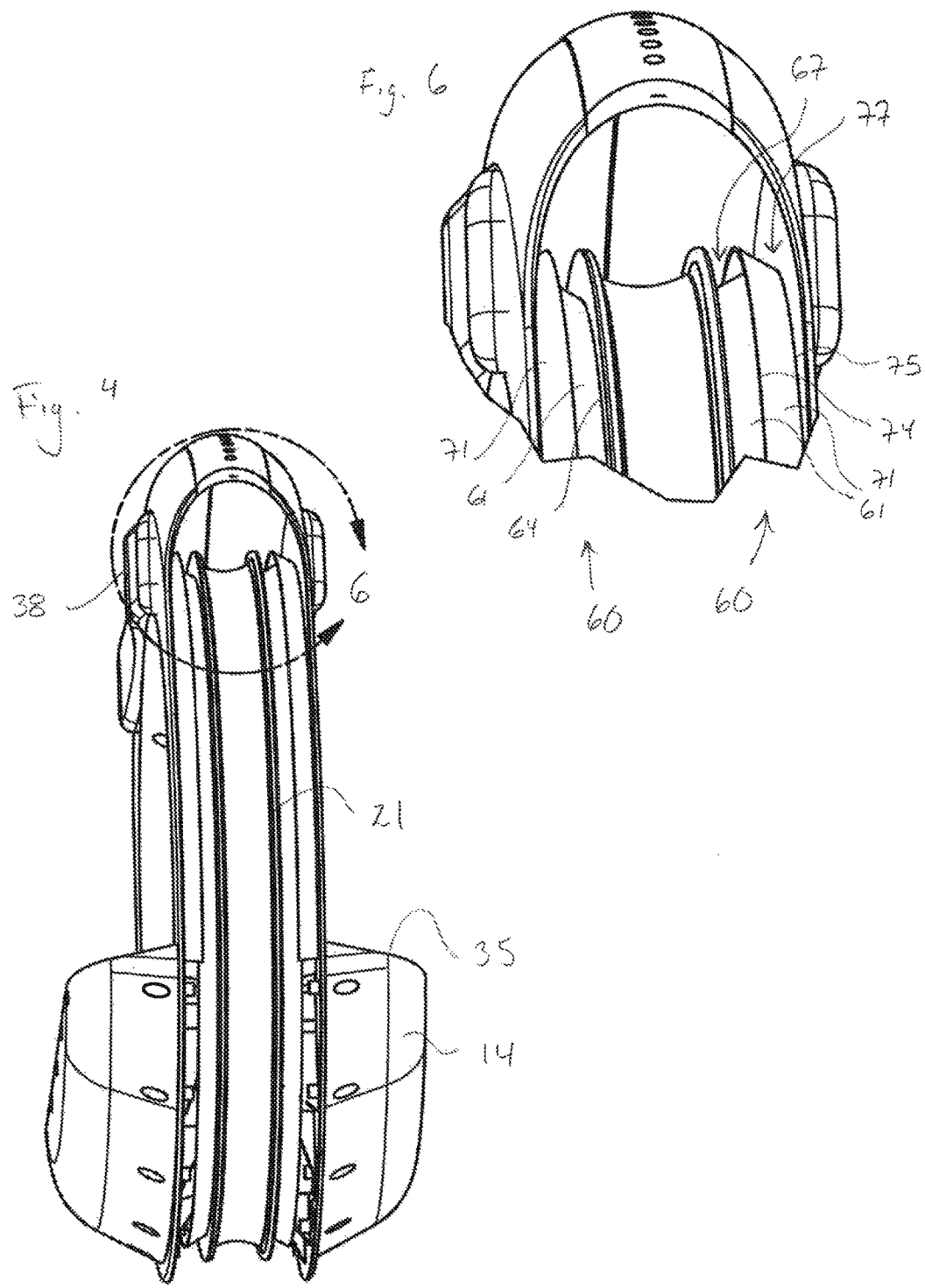

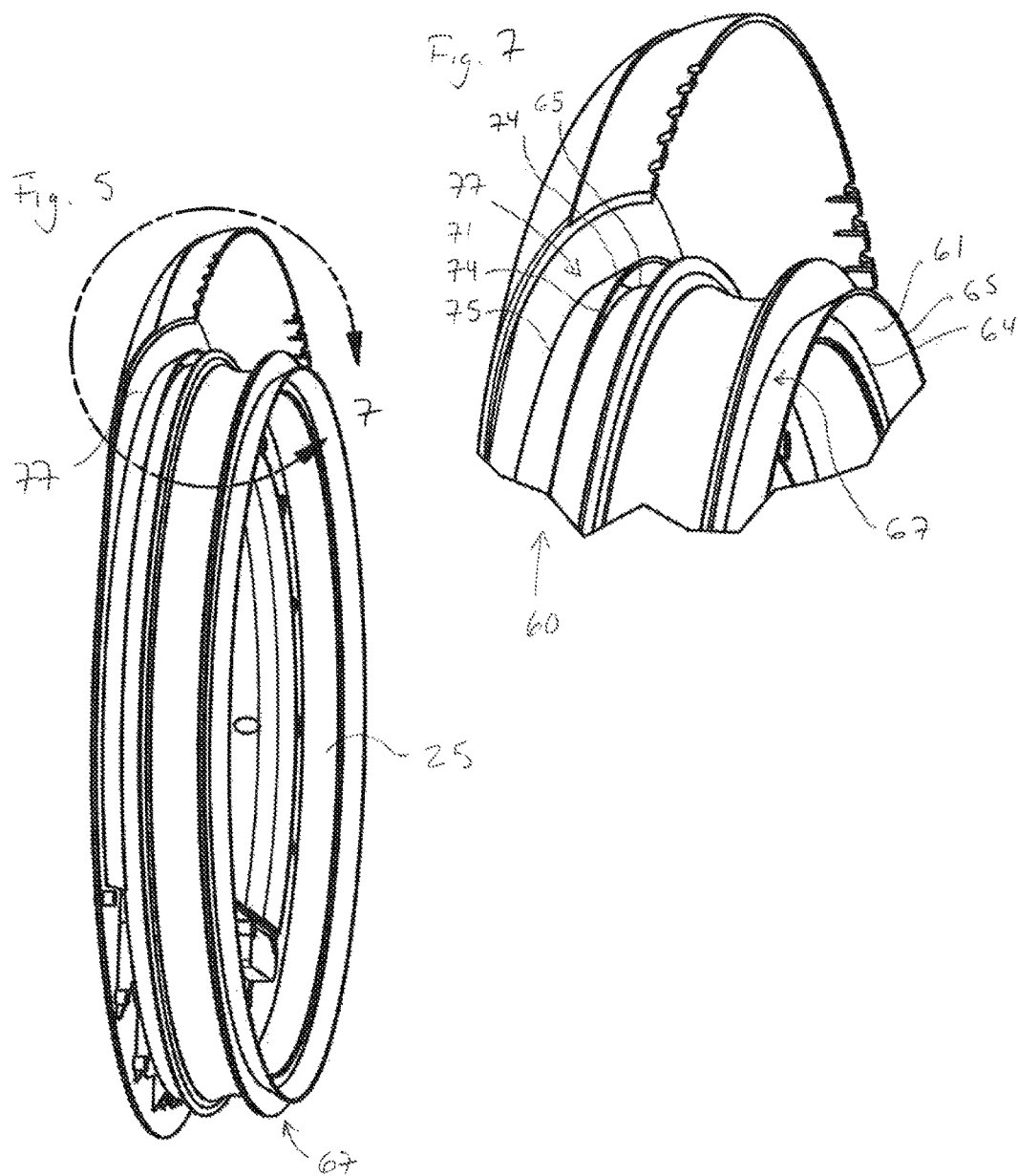

WATER SHIELD FOR USE IN A FRICTION DRIVE VEHICLE AND A VEHICLE HAVING SAME

CROSS REFERENCE TO RELATED APPLICATIONS

This application claims the benefit of earlier filed U.S. provisional application No. 62/241,050, filed Oct. 13, 2015, entitled Water Wheel Guard for Preventing Friction Drive Slippage by the inventor herein.

FIELD OF THE INVENTION

The present invention relates to inhibiting moisture penetration, particularly from rain water, into a wheel envelope and, more specifically, to inhibiting moisture penetration into the drive mechanism of a vehicle propelled with a friction based drive.

BACKGROUND OF THE INVENTION

The prior are includes self-balancing, single wheel structure vehicles. One example is the Solowheel, described in U.S. Pat. No. 8,807,250 issued to Chen (the inventor herein) on Aug. 19, 2014, and entitled Powered Single-Wheel Self-Balancing Vehicle for Standing User. Another example is the device of Simeray, described in U.S. Pat. No. 8,616,313, issued on Dec. 31, 2013, and entitled Motorized Transport Vehicle for a Pedestrian.

These prior art devices illustrate the use of drive motors and related components that may be disadvantageously heavy, power consumptive (requiring more and heavier batteries) and/or bulky.

With respect to overall device weight, it is desirable to have a lightweight device. This would permit a user to readily stow or carry the device. Consider, for example, a user who might use the device to get to a bus stop, stow the device during the bus ride and then remount the device upon descending the bus. This on-again, off-again stow and unstow routine could be repeated for other errands or destinations through the day. It is desirable in this instance that the device is sufficiently lightweight to be readily carried or stowed, for example, in a backpack or the like.

With respect to drive systems, small, lightweight and higher efficiency friction drive motors are known in the art. One embodiment of a friction drive motor is shown in FIG. 3 herein and others are shown in U.S. patent application Ser. No. 14/811,702, filed Jul. 28, 2015, by Chen, and entitled Fore-Aft Self-Balancing Transportation Device with Low and Centered Foot Platform, which is hereby incorporated by reference as though disclosed in its entirety herein. These devices include the positioning of a drive head onto the interior surface of the rim. When it is raining or other moisture is present, however, the contact surface of the rim may become wet causing the drive head to "slip" on the rim contact surface, thereby reducing the ability of the device to perform fore-aft self-balancing and diminishing user control of the device.

Thus, a need exists to inhibit moisture penetration into the wheel envelope or onto the drive head or drive surface of a personal transportation device so that lightweight and more energy efficient friction drive motors may be used in these devices.

SUMMARY OF THE INVENTION

Accordingly, it is an object of the present invention to provide a more lightweight and easily portable personal transportation device.

It is another object of the present invention to provide a water guard arrangement for friction-drive propelled vehicles of any type.

It is also an object of the present invention to provide a water guard arrangement for a personal transportation device having a friction drive.

These and related objects of the present invention are achieved by use of a water shield arrangement for use in a friction drive vehicle and a vehicle having same as described herein.

The attainment of the foregoing and related advantages and features of the invention should be more readily apparent to those skilled in the art, after review of the following more detailed description of the invention taken together with the drawings.

BRIEF DESCRIPTION OF THE DRAWINGS

FIGS. 4 and 5 are a front end perspective view and a cutaway perspective view, respectively, of one embodiment of water shield arrangements in accordance with the present invention FIGS. 6 and 7 are enlarged sectional views from FIGS. 4 and 5, respectively.

DETAILED DESCRIPTION

Figure 1:
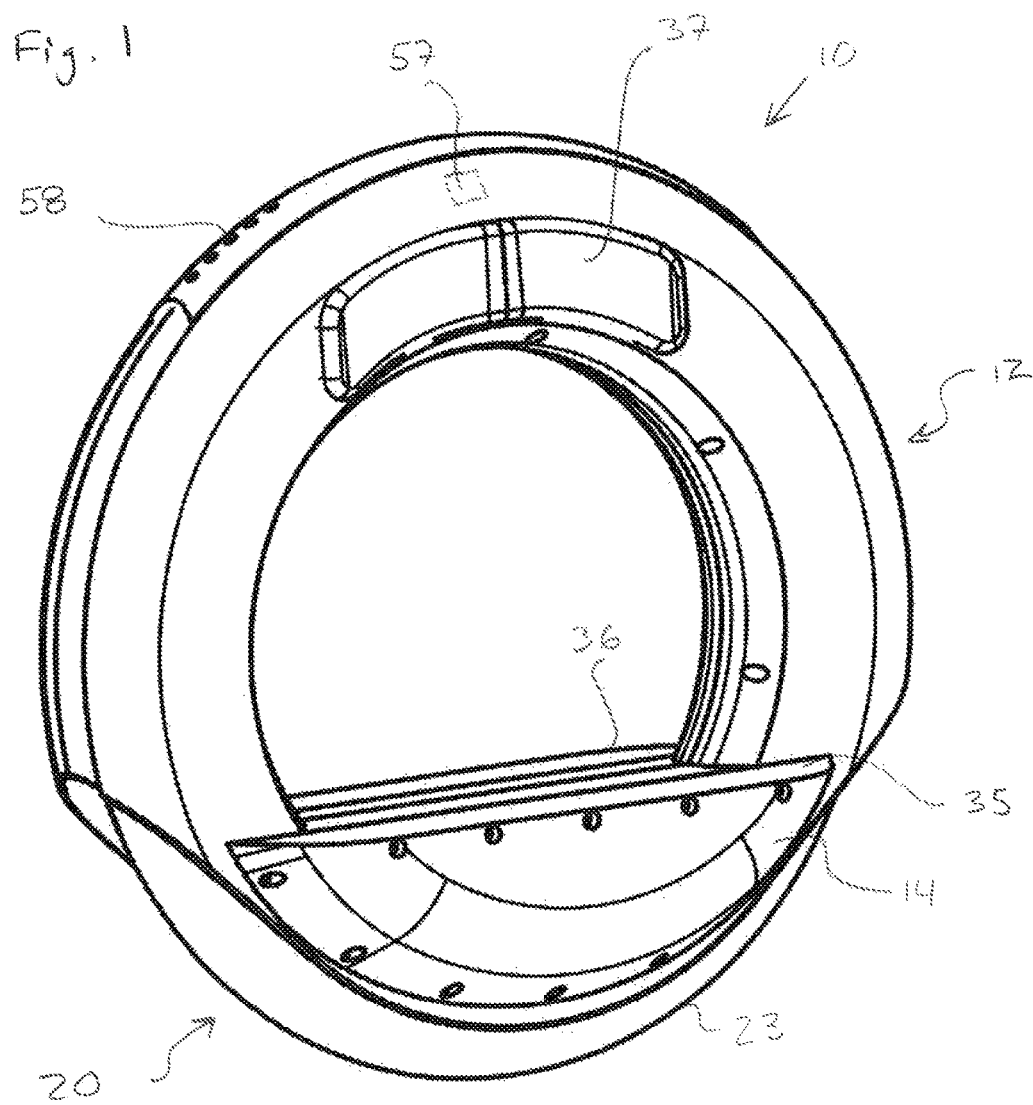
FIGS. 1 and 2 are a perspective view and a side elevation view, respectively, of a single wheel structure transportation device having a water guard in accordance with the present invention.
Figure 2:
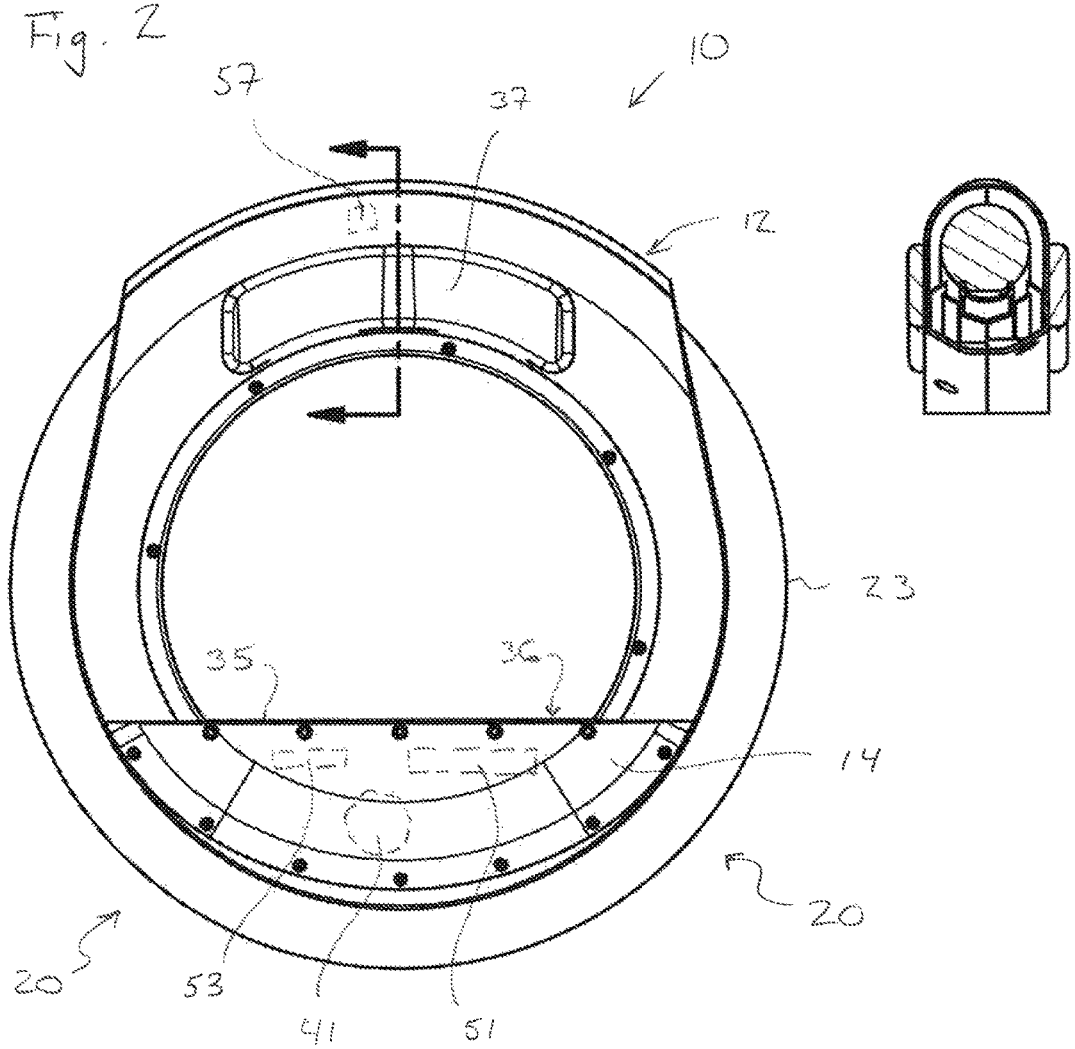

Referring to FIGS. 1 and 2, a perspective view and a side elevation view of a personal transportation device 10 having water shield arrangements in accordance with the present invention are respectively shown. The water shield arrangements are described in more detail below with reference to FIGS. 3-5.

Device 10 has a wheel structure 20 that may include a wheel rim 21 and a tire 23. While only one tire is shown in FIG. 1, more than one tire (for example, two parallel tires) may be mounted to rim 21. The term "wheel 20" may also be used herein and it is intended to mean a wheel structure unless otherwise noted. A housing 12 may cover a portion of wheel structure 20. Housing 12 covers more of wheel 20 in FIG. 1 than in FIG. 2. Two foot platforms 35,36 are provided on opposite sides of the wheel, and housing sections 14 may extend from the main housing 12 and support or define the foot platforms 35,36. Lower leg contact surfaces 37,38 that may increase friction and/or be compressive to provide comfort are preferably provided above each of foot platforms 35,36, respectively.

Housing sections 14 preferably houses drive motors 41 and batteries 51, and may contain electronic control circuitry 53 (see FIG. 2). A gyroscopic or other suitable position sensor 57 is preferably provided, and may be located towards the top (or elsewhere) of the device. As is known for single wheel structure self-balancing devices, the electronic control circuitry 53 receives position data from sensor 57 and sends drive signals to the drive motor(s) 41 to drive wheel structure 20 toward self-balancing. Suitable batteries, sensors and electronic control circuitry are known in the art. Device 10 may also include indicator and/or pathway lighting 58.

Figure 3:
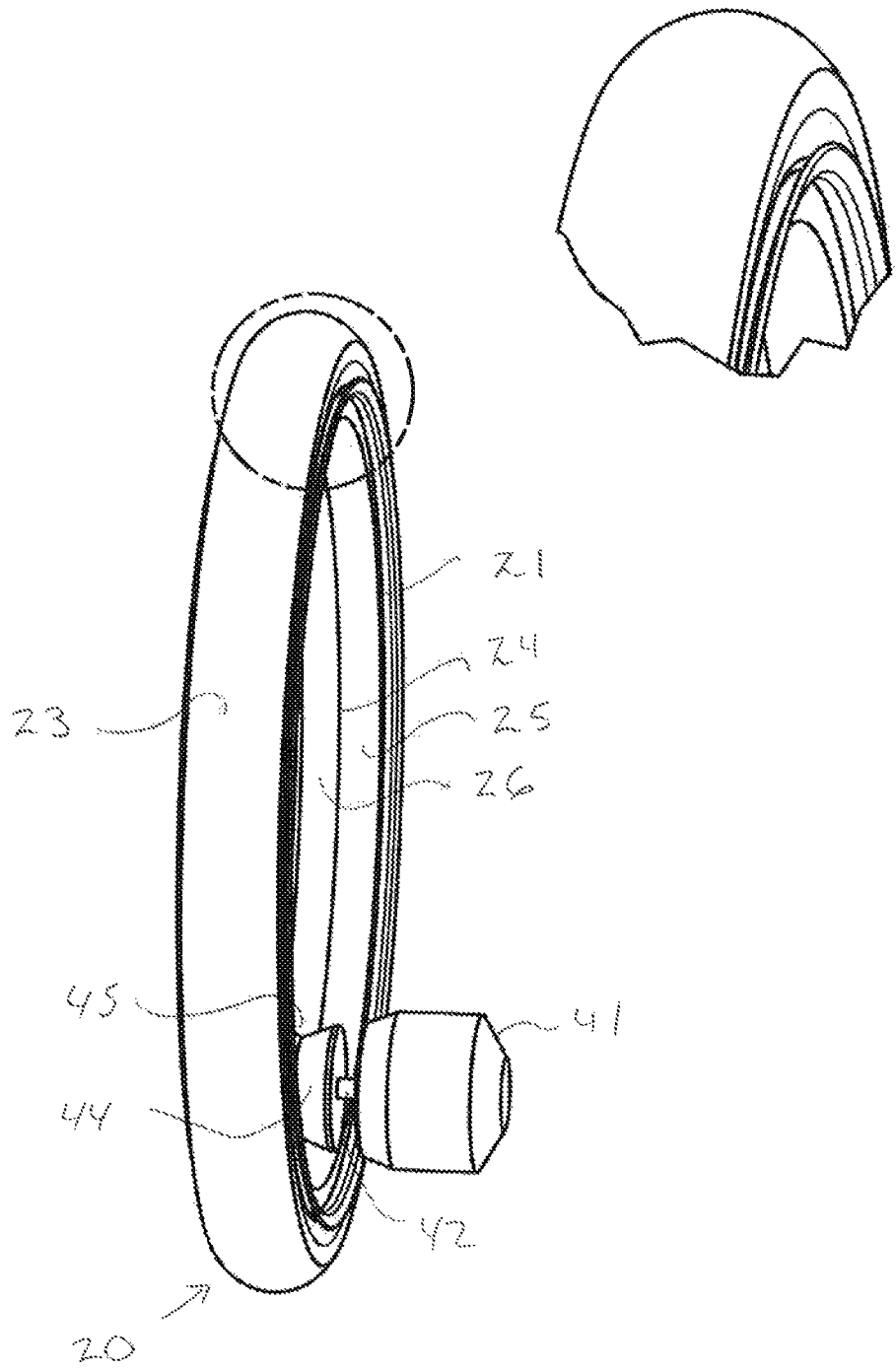
FIG. 3 is a perspective view of wheel structure 20 without housing 12 (and other components) for use in the device of FIGS. 1 and 2.

Referring to FIG. 3, a perspective view of wheel structure 20 without housing 12 (and other components) is shown. FIG. 3 illustrates one embodiment of a friction drive arrangement (others are taught in U.S. patent application Ser. No. 14/811,702 mentioned above). In the embodiment of FIG. 3, rim 21 has a central ridge 24 and two drive surfaces 25,26 that preferably slope away from the ridge. Drive head 44 has two surfaces 45,46 that are preferably complementary to drive surfaces 25,26. Ridge 24 serves to center drive head 44 on rim 21. A drive shaft 42 extends from drive motor 41 to head 44.

Drive motor 41 may be a suitable drive motor. Many are known in the art. Being lightweight, energy efficient, sufficiently powerful and/or cost-effective are among the criteria for selecting an appropriate drive motor. A significant aspect of friction drive motors is that since they tend to be energy efficient, fewer battery cells are required which lessens vehicle weight considerably. Further, friction drive motors tend to be small which allows for the use of two motors, for example, one to provide redundancy or a slower, safer wind down if another fails.

FIG. 3 also shows an inner member 61 of a water shield assembly 60 in accordance with one embodiment of the present invention. Inner member 61 and water shield arrangements or assemblies 60 are shown in more detail in FIGS. 4-7.

Referring to FIGS. 4 and 5, a front perspective view and a cutaway perspective view of one embodiment of water shield arrangements 60 in accordance with the present invention are respectively shown. Note that for teaching purposes, tire 23 has been removed. FIGS. 6 and 7 are enlarged sectional views from FIGS. 4 and 5, respectively.

To prevent or significantly reduce moisture movement into the "rim envelope," the volume defined by the interior of the rim and the two parallel vertical planes that touch the outer edges of the rim (i.e., to eliminate water at the drive head and drive surface), two water shields are provided. The each consist of a pair of overlapping shield members that are termed the inner member 61 and the outer member 71, where inner and outer are relative to distance from the rim. The inner and outer members are separate and preferably not in contact so that the inner may spin freely without contacting the outer. They are preferably partially overlapping, to an extent that little or no water enters into the gap between them.

For each pair, the inner edge 64 of inner member 61 is coupled to rim 21 and the outer edge 65 is preferably larger in diameter than inner edge 64. Inner member 61 is preferably contoured, sloped, conical or otherwise arranged such that together with rim 21, a groove or depression 67 is formed between inner member 61 and rim 21. Water landing on the back side of inner member 61 (visible in FIG. 4) flows into groove 67 and down to the bottom of the wheel where it is expelled by gravity. The attachment between the inner member and the rim is preferably continuous.

The outer member 71 is preferably mounted to the interior of housing 12 or a like frame or structure (see FIG. 4-7). The inner and outer members are configured such that they overlap, in such a manner that much of the spray off tire 23 drips down groove 67 or 77 in one or the other member. The outer member may be fully circular or partially circular. For example, it can be seen in FIGS. 4-5 that the outer member ends just below the platform. During installation, the inner member may be slid into the partially annular outer member.

While, in FIGS. 5-7, the inner member fits within the outer member, it should be recognized that this may be reversed such that the outer member fits within the inner member. They are preferably co-axial.

In the embodiment of FIG. 4, inner edge 64 of inner member 61 (the edge which is attached to the rim) has a diameter that is smaller than the diameter of the outer circumference of the rim. The outer edge 65 preferably has a diameter that is greater than that of inner edge 64.

The inner edge of the outer member (that closer to the rim) preferably has a diameter larger than that of the outer edge of the inner member, but smaller than the diameter of the wheel. The diameter of the outer member's outer edge is smaller than that of its inner edge. The attachment between the outer member and the housing is watertight. Thus water coming from wheel 20 onto the outer member stays close to the housing and flows downward away from the top of the ring, eventually falling out of the vehicle onto the ground. Since the outer member partially encircles the inner member, substantially all water carried into the vehicle by the wheel falls onto one of the two members and is directed out of the vehicle. This prevents water from falling onto the interior surface of the rim and causing slippage between the drive member and the rim. (A slight amount of water may happen to reach the rim's interior surface, but the amount of water is so small as to be negligible. The rapidly rotating drive member will disperse stray droplets and generate heat which helps to dry the rim.)

The wheel rim water guard of the present invention is useful for a variety of vehicles because it makes friction drive systems more practical, which expands options for lightweight, portable vehicle designs. In particular, this water guard is very important to friction drive designs for vehicles having dynamic pitch balancing, where proper functioning of the balancing system relies on uninterrupted torque.

It should be noted that while FIGS. 1-2 illustrate a single wheel structure vehicle, the water shield arrangements of the present invention are applicable to vehicles having 2, 3, or 4 wheels and other wheel number and/or type configurations.

It should be further noted that if only one guard member is provided, the inner member is more important. Furthermore, the inner member may be coupled to the rim or the tire, and it may be formed integrally with the rim or tire or attached subsequently as an add-on.

The inner and outer members may be formed of plastic, metal, rubber or rubberized plastic, and/or other suitable materials.

While the invention has been described in connection with specific embodiments thereof, it will be understood that it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth, and as fall within the scope of the invention and the limits of the appended claims.

The invention claimed is:
1. A personal transportation device, comprising:
a wheel structure having a rim and at least a first tire mounted on the rim;
a drive motor that drives the wheel structure;
a weight bearing platform that bears, at least in part, the weight of a rider; and a substantially annular first water diversion member that is coupled to and extends laterally, at least in part, from the wheel structure;

wherein the first diversion member has an inner edge coupled to the wheel structure and an outer edge spaced from the wheel structure and the area defined by the inner edge is less than the area defined by the outer edge.

2. The device of claim 1, wherein the first diversion member extends from the rim.

3. The device of claim 1, wherein the first diversion member extends from the tire.

4. The device of claim 1, wherein the first diversion member is coupled to the wheel structure in such a manner as to form an annular groove that directs water, under the force of gravity, away from an interior of the wheel structure.

5. The device of claim 1, further comprising a second water diversion member having a shape that is, at least in part, complementary with that of the first diversion member to facilitate movement of water away from the interior of the wheel structure.

6. The device of claim 1, further comprising a second water diversion member that is spaced from yet laterally overlaps, at least in part, the first diversion member.

7. The device of claim 6, further comprising a housing that covers at least a portion of the wheel structure, and wherein the second diversion member is coupled to an interior of the housing and extends laterally, at least in part, towards the wheel structure.

8. The device of claim 1, wherein the rim structure has an interior drive contact surface and a region at which the first tire is mounted, and wherein the first diversion member is coupled to the rim between the drive contact surface and the region at which the first tire is mounted.

9. The device of claim 8, wherein the motor is a friction drive motor having a drive head that contacts the drive contact surface of the rim.

10. The device of claim 1, further comprising a position sensor that senses a position and a control circuit, coupled to the sensor and the drive motor, that drives the drive motor towards self-balancing the device based on position data from the sensor.

11. The device of claim 1, wherein the weight bearing platform includes a first foot platform and a second foot platform and the first and second foot platforms are on opposite sides of the wheel structure.

12. A personal transportation device, comprising:
a wheel structure having a rim and at least a first tire mounted on the rim;
a motor that drives the wheel structure;
a weight bearing platform that bears, at least in part, the weight of rider;
a first water diversion member that is coupled to and extends laterally, at least in part, from the wheel structure, and is configured to rotate with the wheel structure; and
a second water diversion member that overlaps laterally, at least in part, the first diversion member to divert water away from an interior of the wheel structure.

13. The device of claim 12, wherein the first diversion member extends from the rim.

14. The device of claim 12, further comprising a housing that covers at least a portion of the wheel structure, and wherein the second diversion member is coupled to an interior of the housing and extends laterally, at least in part, towards the wheel structure.

15. The device of claim 12, wherein the second water diversion member has a shape that is, at least in part, complementary with that of the first diversion member, and the first and second diversion members are configured to facilitate movement of water, under the force of gravity, away from the interior of the wheel structure.

16. The device of claim 12, wherein the motor is a friction drive motor having a drive head that contacts a drive contact surface of the rim.

17. The device of claim 12, further comprising a position sensor that senses a position and a control circuit coupled to the sensor and the drive motor, the control circuit driving the drive motor towards self-balancing the device based on position data from the sensor.

18. A personal transportation device, comprising:
a wheel structure having a rim and at least a first tire mounted on the rim;
a friction drive motor that drives the wheel structure;
a weight bearing platform that bears, at least in part, the weight of rider;
a first water diversion member that is coupled to and extends laterally, at least in part, from the wheel structure; and
a second water diversion member that overlaps laterally, at least in part, the first diversion member to divert water away from an interior of the wheel structure;
wherein one of the first and second water diversion members is configured to rotate with the wheel structure.

19. The device of claim 18, further comprising a position sensor that senses a position and a control circuit coupled to the sensor and the drive motor, the control circuit driving the drive motor towards self-balancing the device based on position data from the sensor.

20. The device of claim 18, wherein the weight bearing platform includes a first foot platform and a second foot platform and the first and second foot platforms are on opposite sides of the wheel structure.

* * * * *